US011526497B2

(12) United States Patent
Banerjee et al.

(10) Patent No.: US 11,526,497 B2
(45) Date of Patent: Dec. 13, 2022

(54) TENANT CUSTOMIZATION OF MASTER DATA IN A MULTI-TENANT COMPUTING SYSTEM

(71) Applicant: SAP SE, Walldorf (DE)

(72) Inventors: Rick Banerjee, Bangalore (IN); Himanshu Joshi, Bangalore (IN)

(73) Assignee: SAP SE, Walldorf (DE)

( * ) Notice: Subject to any disclaimer, the term of this patent is extended or adjusted under 35 U.S.C. 154(b) by 45 days.

(21) Appl. No.: 17/114,135

(22) Filed: Dec. 7, 2020

(65) Prior Publication Data

US 2022/0179844 A1 Jun. 9, 2022

(51) Int. Cl.
*G06F 16/23* (2019.01)
*G06F 16/245* (2019.01)
*G06F 16/27* (2019.01)
*G06F 16/22* (2019.01)

(52) U.S. Cl.
CPC ...... *G06F 16/2379* (2019.01); *G06F 16/2282* (2019.01); *G06F 16/245* (2019.01); *G06F 16/278* (2019.01)

(58) Field of Classification Search
CPC ............. G06F 16/2282; G06F 16/2291; G06F 16/2379; G06F 16/245; G06F 16/24552; G06F 16/278
See application file for complete search history.

(56) References Cited

U.S. PATENT DOCUMENTS

| 7,933,869 B2* | 4/2011 | Becker | G06F 16/275 |
| | | | 707/625 |
| 2005/0223022 A1* | 10/2005 | Weissman | G06F 16/289 |
| | | | 707/999.102 |
| 2010/0191656 A1* | 7/2010 | Martin | H04L 67/06 |
| | | | 705/26.1 |
| 2012/0173589 A1* | 7/2012 | Kwon | G06F 16/951 |
| | | | 707/E17.005 |
| 2014/0067852 A1* | 3/2014 | Wong | G06F 16/245 |
| | | | 707/769 |

(Continued)

FOREIGN PATENT DOCUMENTS

JP 2015162039 A * 9/2015

OTHER PUBLICATIONS

Pippal et al. "A simple, adaptable and efficient heterogeneous multi-tenant database architecture for ad hoc cloud". 2013. Journal of Cloud Computing, 2(1), 1-14. doi:http://dx.doi.org/10.1186/2192-113X-2-5 (Year: 2013).*

*Primary Examiner* — James E Richardson
(74) *Attorney, Agent, or Firm* — Buckley, Maschoff & Talwalkar LLC

(57) ABSTRACT

A method can include initiating one or more transactions in response to a request associated with a first tenant in a multi-tenant computing system. The multi-tenant computing system can store a table of system master data. A determination can be made as to whether the first tenant has a table of customized master data that can include customized data values absent from the table of system master data. Based on the determination, one or more of the table of system master data and the table of customized master data can be used to respond to the request. A response to the request can be provided. Related systems and articles of manufacture, including computer program products, are also provided.

20 Claims, 8 Drawing Sheets

(56) References Cited

U.S. PATENT DOCUMENTS

| | | | |
|---|---|---|---|
| 2016/0103914 A1* | 4/2016 | Im | G06F 16/951 707/770 |
| 2016/0371315 A1* | 12/2016 | Kwon | G06F 16/211 |
| 2020/0265062 A1* | 8/2020 | Srinivasan | G06F 16/256 |
| 2020/0379970 A1* | 12/2020 | Vasilevskiy | G06F 16/256 |

* cited by examiner

| | TenantID | Time Created | Time Updated | Country | Currency |
|---|---|---|---|---|---|
| 230 | System | 28-Jun-2020, 04:26 PDT | 28-Jun-2020, 13:27 PDT | Japan | Yen |
| 235 | System | 29-Jun-2020, 03:58 PDT | 29-Jun-2020, 16:58 PDT | Canada | Dollar |
| 240 | System | 01-Jul-2020, 12:13 PDT | 01-Jul-2020, 18:55 PDT | China | Renminbi |

TENANT CUSTOMIZATION OF MASTER DATA IN A MULTI-TENANT COMPUTING SYSTEM

TECHNICAL FIELD

The subject matter described herein relates generally to database processing and more specifically to the customization of tenant master data in a multi-tenant computing system.

BACKGROUND

A database (e.g., a relational database, a non-relational database, and/or the like) can be configured to store a plurality of electronic data records. These data records can be organized into various database objects including, for example, database tables, graphs, documents, and/or the like. The database can be coupled with a database management system (DBMS) that supports a variety of operations for accessing the data records held in the database. These operations can include, for example, structure query language (SQL) statements, a graph query language statement, and/or the like.

SUMMARY

Systems, methods, and articles of manufacture, including computer program items, are provided for processing a transaction using one or more of system master data or tenant customized master data.

In one aspect, there is provided a system. The system can include at least one data processor and at least one memory. The at least one memory can store instructions that cause operations when executed by the at least one data processor. The operations can include initiating one or more transactions in response to a request associated with a first tenant included in a plurality of tenants in a multi-tenant computing system. The multi-tenant computing system can include a first database having one or more partitions. Each partition can correspond to one or more of the plurality of tenants, and one of the partitions can store a table of system master data available for use by each of the plurality of tenants. The table of system master data can include one or more attributes, and each attribute can have a corresponding set of one or more values. The operations can determine whether the first tenant has a table of customized master data. The table of customized master data can include one or more customized data values absent from the set of one or more values in the table of system master data. The table of customized master data can be accessible only for transactions associated with the first tenant. Based on the determination, one or more of the table of system master data and the table of customized master data can be used to respond to the request. A response to the request can be provided.

In some variations, one or more features disclosed herein including the following features can optionally be included in any feasible combination.

In some variations, the table of customized master data can be stored at a first partition in the first database, and the first partition can be associated with the first tenant.

In other variations, the table of customized master data can be stored at a second database maintained by the first tenant.

The determination can include querying the first database to determine a location of the table of customized data values, and querying the second database to determine the location of the table of customized data values. In some variations, the first database can be queried before the second database. In other variations, the first database can be queried at substantially the same time as the second database.

The operations can fetch the one or more customized data values from the table of customized master data at the second database. The operations can combine the one of more customized data values with the one or more values in the table of system master data to respond to the request.

The multi-tenant computing system can include one or more applications. The first tenant can be associated with one or more user nodes logged into the one or more applications. In these variations, the operations can send a notification to each of the one or more user nodes regarding the table of customized master data. The notification can cause the one or more user nodes to update one or more caches to reflect the table of customized master data.

The one or more applications can include an upstream application and a downstream application. The operations can send a notification to the downstream application regarding the table of customized master data.

In some variations, a record of one or more changes to the table of customized master data can be maintained.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a search engine, it should be readily understood that such features are not intended to be limiting. The claims that follow this disclosure are intended to define the scope of the protected subject matter.

DESCRIPTION OF DRAWINGS

The accompanying drawings, which are incorporated herein and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The description that follows includes illustrative systems, methods, techniques, instruction sequences, and computing machine program products that embody illustrative implementations. In the following description, for purposes of explanation, numerous specific details are set forth in order to provide an understanding of various implementations of the inventive subject matter. It will be evident, however, to those skilled in the art, that implementations of the inventive subject matter may be practiced without these specific details. In general, well-known instruction instances, protocols, structures, and techniques have not been shown in detail.

Master data is core data that can be used in a variety of software applications. Master data can contain information about materials, suppliers, vendors, customers, and the like, and this information can be used to process a variety of transactions in applications. In a multi-tenant computing system, system master data can be used by one or more tenants. However, a need can arise for a tenant to customize master data in a tenant specific manner. This need can arise from legal constraints, compliance issues, operational considerations, and the like. For example, a national law can prohibit companies from conducting business in an embargoed country. In order to account for this legal restriction, a software application may lack master data associated with the embargoed country. In some situations, however, a legal exception to the embargo can be granted to non-profit companies that provide humanitarian aid, for example. In order for these companies to use the software application, tenant customization of the master data is needed.

Figure 1:
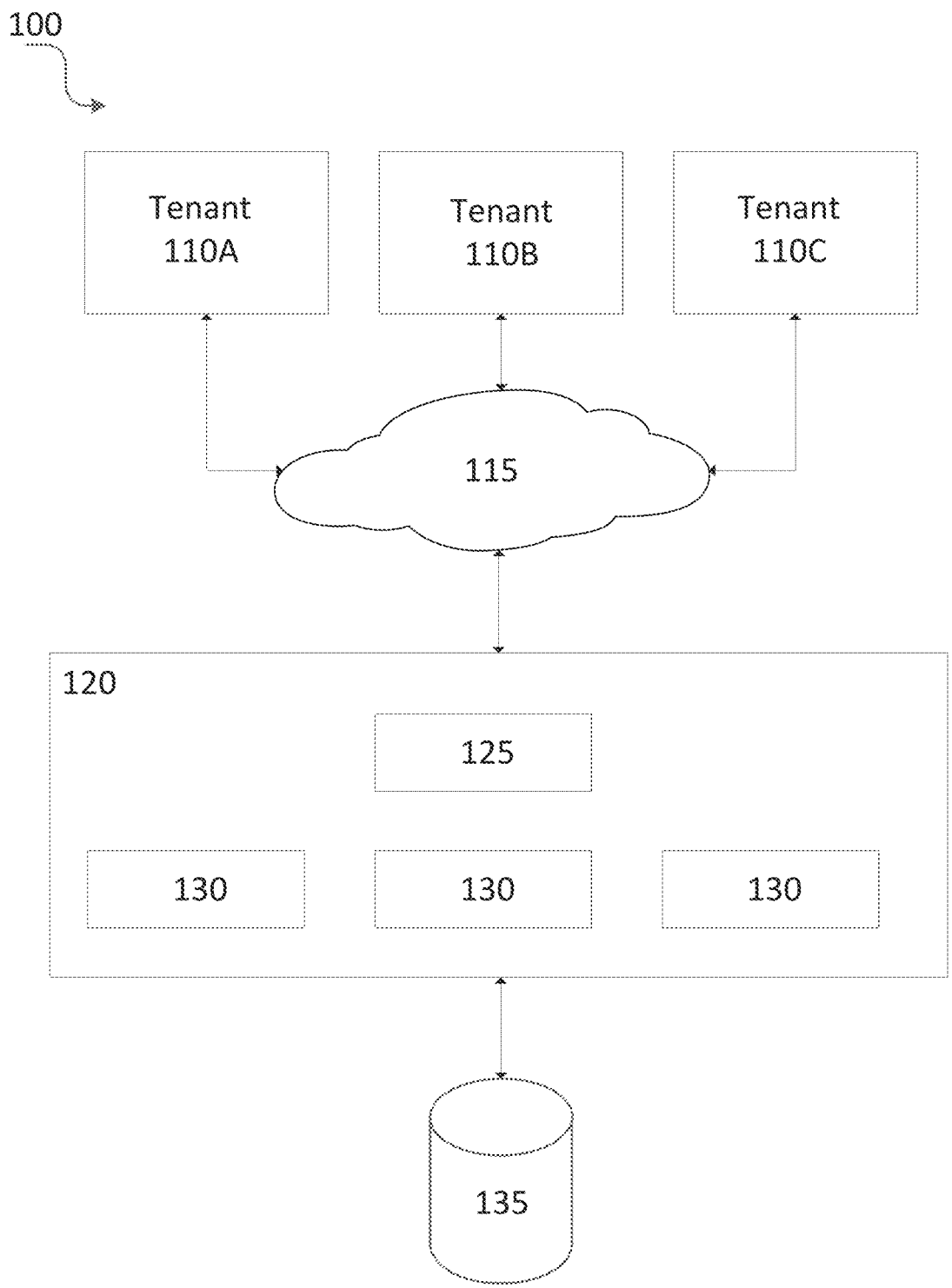
FIG. 1 depicts a multi-tenant computing system, in accordance with some example implementations.

FIG. 1 illustrates a multi-tenant computing system 100. The multi-tenant computing system 100 can include an application server 120, which can in some variations include multiple server systems 130 that are accessible over a network 115 from client machines operated by users at each of multiple organizations 110A, 110B, and 110C (referred to herein as "tenants" of a multi-tenant system) supported by a single software delivery architecture. For a system in which the application server 120 includes multiple server systems 130, the application server can include a load balancer 125 to distribute requests and actions from users at the one or more tenants 110A, 110B, and 110C to the one or more server systems 130. A user can access the software delivery architecture across the network using a thin client, such as for example a web browser or the like, or other portal software running on a client machine. The application server 120 can access data and data objects stored in one or more data repositories 135.

Figures 2A, 2B:
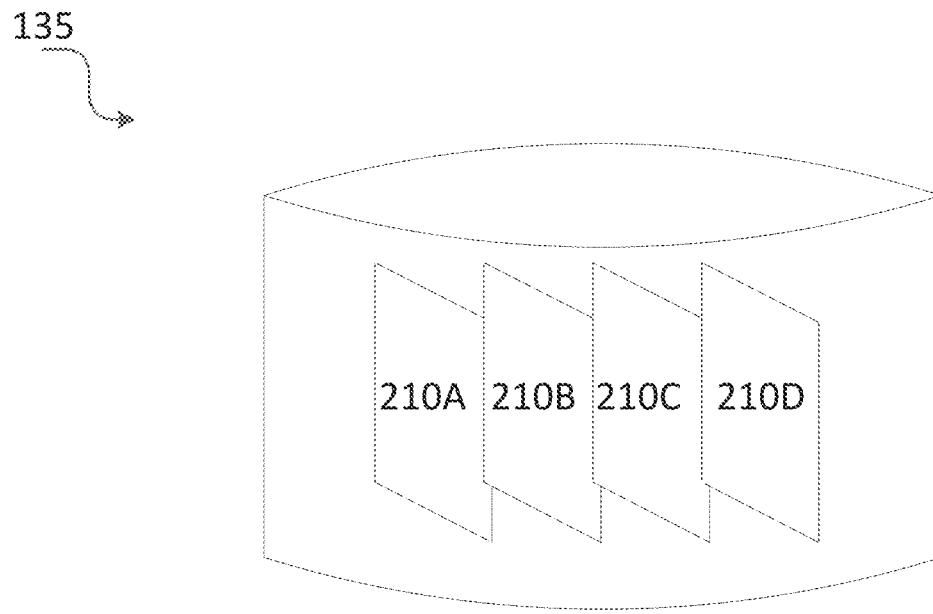
FIG. 2A depicts a data repository having multiple partitions, in accordance with some example implementations.
FIG. 2B depicts a table of system master data, in accordance with some example implementations.

FIG. 2A illustrates a magnified view of data repository 135. Data repository 135 can be a relational database that can be divided into one or more partitions. Data repository 135 can store tenant specific data for each tenant. However, at least some of the data can be common data that can be shared by multiple tenants, such as master data or other non-tenant specific data.

In the implementation of FIG. 2A, data partition 210A can store data for tenant 110A; data partition 210B can store data for tenant 110B; and data partition 210C can store data for tenant 110C. Data partitions 210A, 210B, and 210C can be isolated in such a way that access is only provided for transactions associated with the corresponding tenant. For example, while tenant 110A and application server 120 may access the tenant's data at data partition 210A while processing transactions for this tenant, the tenant and application server can be prevented from accessing the data stored at data partitions 210B and 210C. Similarly, tenant 110B and application server 120 can access the tenant's data at data partition 210B while processing transactions for this tenant but can be prevented from accessing the data stored at data partitions 210A and 210C. Likewise, tenant 110C and application server 120 can access the tenant's data at data partition 210C while processing transactions for this tenant but can be prevented from accessing the data stored at data partitions 210A and 210B. Data partition 210D can store common data, such as a table of system master data. This table of system master data can be shared by one or more of application server 120 and tenants 110A, 110B, and 110C.

FIG. 2B illustrates a table of system master data 220. Table 220 can include master data records 230, 235, and 240, and each master data record can have multiple attributes or characteristics. In the example of FIG. 2B, these attributes can include a TenantID 245, a time created 250, a time updated 255, a country 260, and a currency 265. Each attribute in a given master data record can have a corresponding value. For example, master data record 230 can have a TenantID value equal to "System", a country value equal to "Japan", and a currency value equal to "Yen". In another example, master data record 235 can have a TenantID value equal to "System", a country value equal to "Canada", and a currency value equal to "Dollar". In yet another example, master data record 240 can have a TenantID value equal to "System", a country value equal to "China", and a currency value equal to "Renminbi". Because master data records 230, 235, and 240 can shared by all of the tenants, the TenantID value for each record is "System".

Shared master data records can be used in a variety of transactions including, for example, procurement transactions, employment related transactions, travel related transactions, and the like. For example, master data records 230, 235, and 240 in FIG. 2B can be used to generate sales documents, such as purchase orders and/or invoices, for procurement transactions occurring in Japan, Canada, and China. If, for example, tenant 110A and 110B only conduct business in these three countries, then master data records 230, 235, and 240 may be sufficient for all of their respective transactions. However, if tenant 110C conducts business in a country absent from master data records 230, 235, and 240, then the master data records in table 220 cannot be used to support these extraordinary transactions. For example, if tenant 110C conducts business in Uganda, and the country value "Uganda" is absent from master data records 230, 235, and 240, then an application server using master data table 220 would not be able to process transactions occurring in this country.

In order to support these extraordinary transactions, the subject matter disclosed herein provides for tenant customization of master data records. Customization can supplement the existing table of system master data records by providing attribute values absent from the shared table of system master data records. Customization can be provided on a tenant-by-tenant basis, and new master data values provided for a tenant can be visible and/or used by only that tenant and application servers processing transactions for that tenant.

Figure 3:
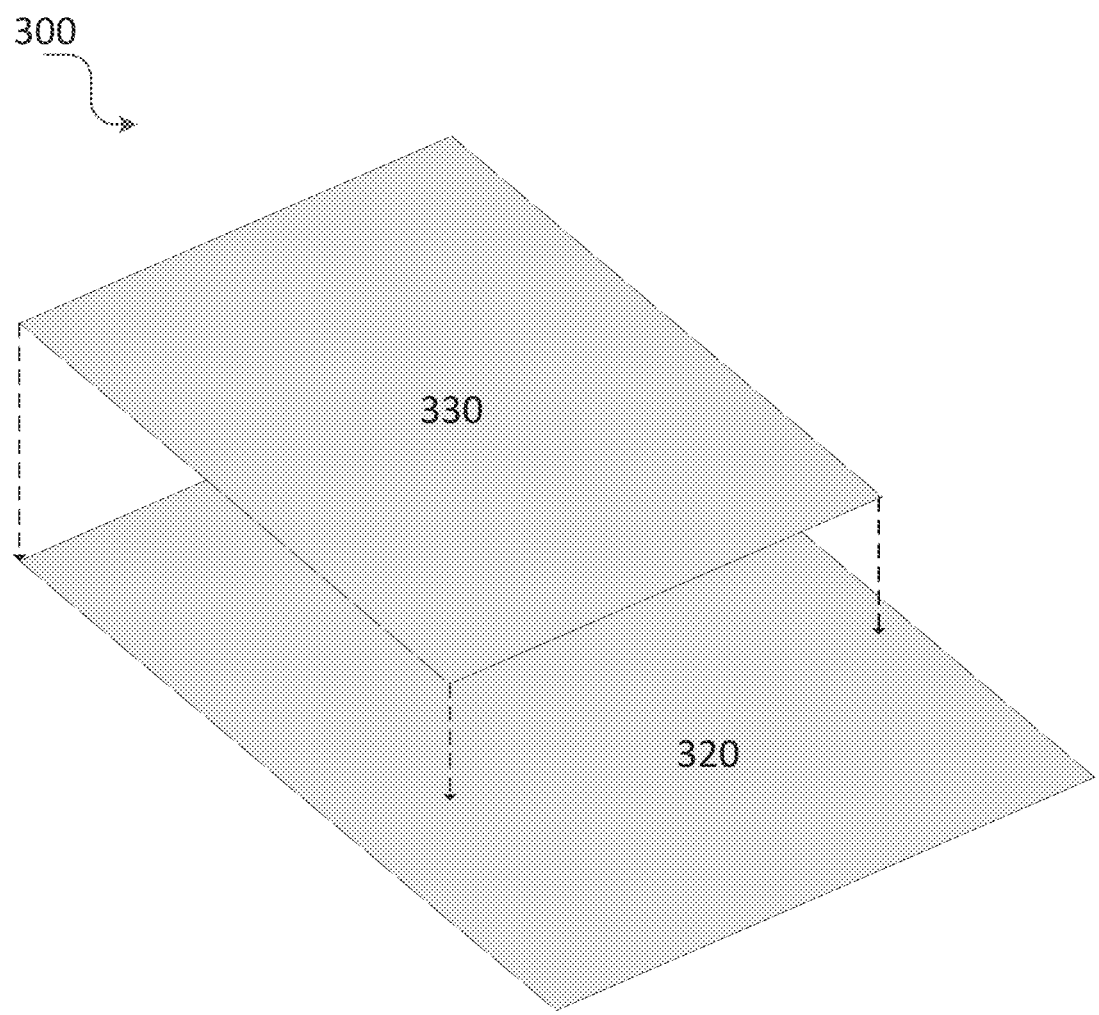
FIG. 3 depicts a relationship between a shared table of system master data and a tenant's table of customized master data, in accordance with some example implementations.

FIG. 3 is a schematic representation 300 of the relationship between a shared table of system master data and a tenant's table of customized master data. The bottom layer 320 can correspond to a table of system master data shared by all the tenants in a multi-tenant computing system, such as table 220, for example. The top layer 330 can correspond to a particular tenant's table of customized master data. Continuing with the example described above with respect to FIG. 2B, tenant 110C can use the table of customized master data in top layer 330 for extraordinary transactions that are not supported by the shared table of system master data 220. For example, when an application server is processing a transaction, it can do so using the table of system master data in bottom layer 320. If the master data values in this table cannot support the transaction, then the application server can use tenant customized master data values in top layer 330. In some implementations, the application server can access the tables in bottom layer 320 and top layer 330 at substantially the same time.

Figures 4A, 4B:
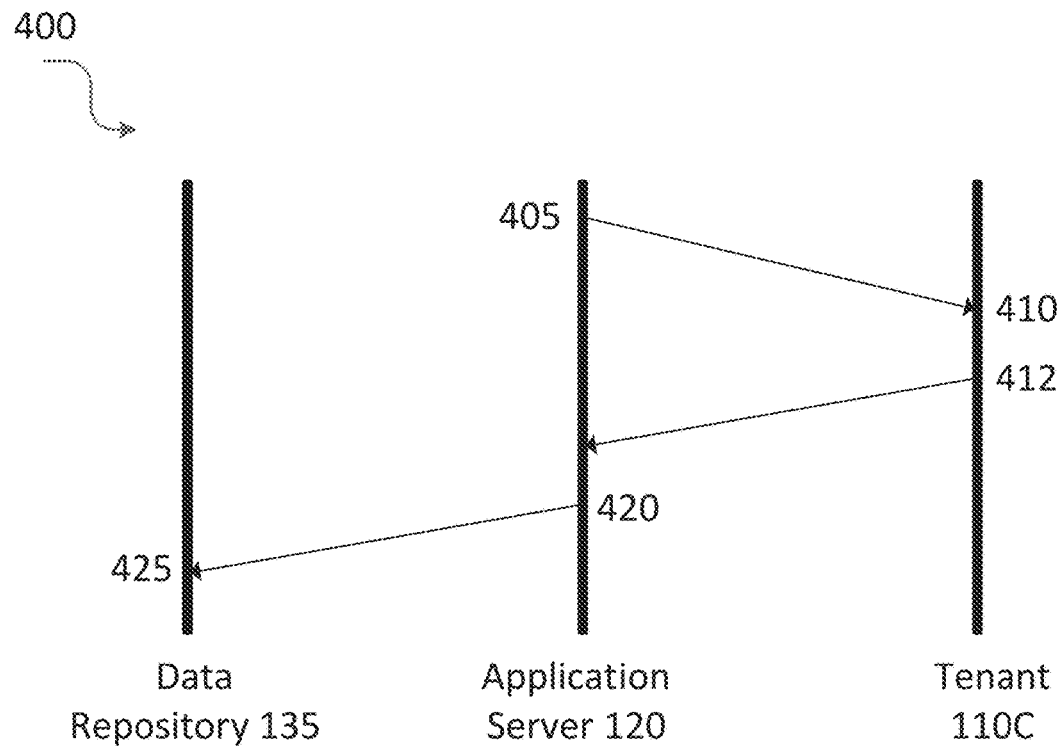
FIG. 4A depicts a time sequence diagram for creating and/or modifying a table of customized master data, in accordance with some example implementations.
FIG. 4B depicts a table of customized master data, in accordance with some example implementations.

FIG. 4A illustrates a time sequence diagram 400 for creating and/or modifying a table of customized master data. In this diagram, time elapses along the vertical axes. At time 405, application server 120 can export a table of system master data to tenant 110C. This table can be the table of system master data 220 illustrated in FIG. 2B, for example.

At time 410, tenant 110C can create and/or modify a table of customized master data based on the master data exported at time 405. This table can include customized data values absent from the original table of system master data 220. FIG. 4B illustrates a table of customized master data 427. Tenant 110C can create the table of customized master data 427 by duplicating and modifying the table of system master data 220.

Table 427 can include customized master data records 430, 435, and 440. Each master data record can have multiple attributes or characteristics. In the example of FIG. 4B, these attributes can include a TenantID 445, a time created 450, a time updated 455, a country 460, and a currency 465. Each attribute in a given master data record can have a corresponding value.

Master data records 430, 435, and 440 can be similar to master data records 230, 235, and 240, respectively, in table 220. In the table of customized master data 427, however, the TenantID 445 can have a value equal to "Tenant 110C" instead of "System". The different TenantID value indicates that master data records 430, 435, and 440 can only be used by tenant 110C and cannot be accessed by other tenants or by the application server while processing transactions for other tenants.

The table of customized master data 427 can also include a new customized master data record 443. The new customized master data record 443 can have attribute values absent from the original table of system master data 220. In the example of FIG. 4B, customized master data record 443 can have a TenantID value equal to "Tenant 110C", a country value equal to "Uganda", and a currency value equal to "Shilling". Notably, the country value "Uganda" and the currency value "Shilling" are absent from the table of system master data 220 in FIG. 2B. The presence of these values in the table of customized master data 427 can facilitate the processing of transactions in this country. Moreover, this customized master data record can only be accessed by tenant 110C or by application server 120 in support of transactions for this tenant as indicated by the TenantID value.

Returning to FIG. 4A, tenant 110C can send the table of customized master data 427 to the application server 120 at time 412. Tenant 110C can send this table via a file upload, a web service call, a REST API call, and the like.

At time 420, application server 120 can send the table of customized master data 427 to data repository 135 provided by multi-tenant computing system 100.

At time 425, data repository 135 can store the table of customized master data 427 at the data partition associated with tenant 110C.

In the implementation of FIG. 4B, the table of customized master data 427 is stored at data repository 135 within multi-tenant computing system 100. This configuration can utilize a common data store design whereby the tenant specific table of customized master data and the shared table of system master data are stored in the same data repository, albeit at different partitions. In some situations, however, a provider of multi-tenant computing system 100 can be prohibited from storing data records associated with certain tenants. These situations can arise if, for example, the provider is legally prohibited from storing tenant data from certain countries. In order to address these situations, the table of customized master data can alternatively be stored at a tenant controlled data repository, as illustrated in FIG. 5.

Figure 5:
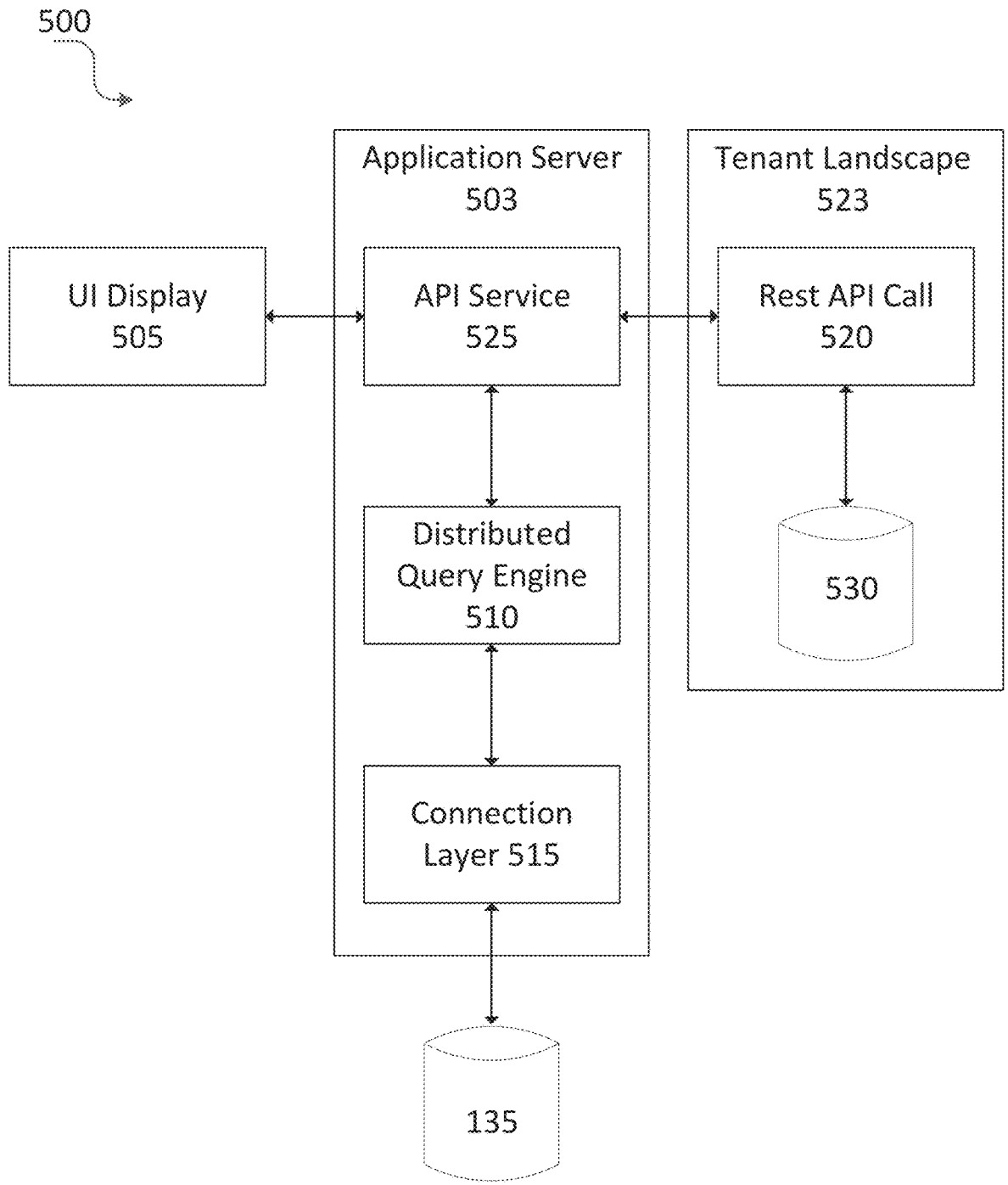
FIG. 5 depicts a system for tenant controlled storage of customized master data, in accordance with some example implementations.

FIG. 5 illustrates a system 500 for tenant controlled storage of customized master data. In this implementation, a table of customized master data, such as table 427, can be stored within tenant landscape 523 at tenant controlled data repository 530. Data repository 530 can be controlled by tenant 110C, for example. Application server 503 can access this table of customized master data in order to process transactions for tenant 110C. Application server 503 cannot access this table to process transactions for other tenants, such as tenants 110A and 110B. The following paragraphs describe how a transaction can be processed by system 500.

A user associated with tenant 110C can enter a request for goods and services at UI display 505. The request can be, for example, the purchase of first aid supplies in Uganda, and the user may enter this request into a procurement application hosted by application server 503. Application server 503 can initiate one or more transactions in order to respond to this request.

Application server 503 can determine whether system master data can be used to process this transaction. Application server 503 can use distributed query engine 510 to fetch the system master data stored at data repository 135. The distributed query engine 510 can access data repository 135 via connection layer 515. The system master data can be stored in a table, such as table 220, in shared partition 210D within data repository 135. Upon examination of table 220, application server 503 can determine that this table does not have any master data records associated with Uganda. In light of this absence, application server 503 cannot use the shared table of system master data 220 to process this transaction.

Because system master data cannot support transactions in Uganda, application server 503 can determine whether customized master data can be used instead. Application server 503 can use distributed query engine 510 to fetch customized master data for tenant 110C.

This customized master data can be stored as a table, such as table 427, in a partition belonging to tenant 110C in data repository 135. Distributed query engine 510 can access data repository 135 via connection layer 515. Upon examination of table 427, application server 503 can find the master data record needed to process the transaction. Specifically, customized master data record 443 can be used because it has a country value equal to "Uganda" which is absent from the table of system master data 220.

Alternatively, the table of customized master data 427 can be stored at a tenant controlled data store, such as data repository 530. In order to access tenant landscape 523, distributed query engine 510 can make a REST API call 520 to API service 525. API service 525 can then fetch the table of customized master data 427 and return this table to application server 503. Application server 503 can use the table of customized master data 427 to process the transaction. In some implementations, application server 503 can use system master data from data repository 135 in combination with tenant customized master data from tenant controlled data repository 530 to process a transaction. In these implementations, distributed query engine 510 can perform a JOIN operation on the records in both tables 220 and 427 and use the combined table of records to process the transaction.

Distributed query engine 510 can query data repository 135 before querying tenant controlled data repository 530. However, other variations are possible. For example, distributed query engine 510 can query both data repository 135 and tenant controlled data repository 530 at substantially the same time. In yet another variation, distributed query engine 510 can query tenant controlled data repository 530 before querying data repository 135.

As described above, application server 503 can determine whether system master data can be used to process the tenant's request. In some implementations, application server 503 can forego this determination altogether. In these implementations, application server 503 can directly proceed to fetch customized master data in order to process the tenant's request without checking the system master data.

Application server 503 can provide a response to the request by sending the response to UI display 505. UI display 505 can display the response to a user.

A multi-tenant computing system can include hundreds of individual applications. Different tenants and different users associated with each tenant can use these applications to submit various requests and perform various transactions. If any changes are made to a particular tenant's customized master data, then these changes should be made visible to all users associated with that tenant in order to ensure transaction consistency. In addition, these changes should be communicated to downstream applications that use the tenant's customized master data.

Figure 6:
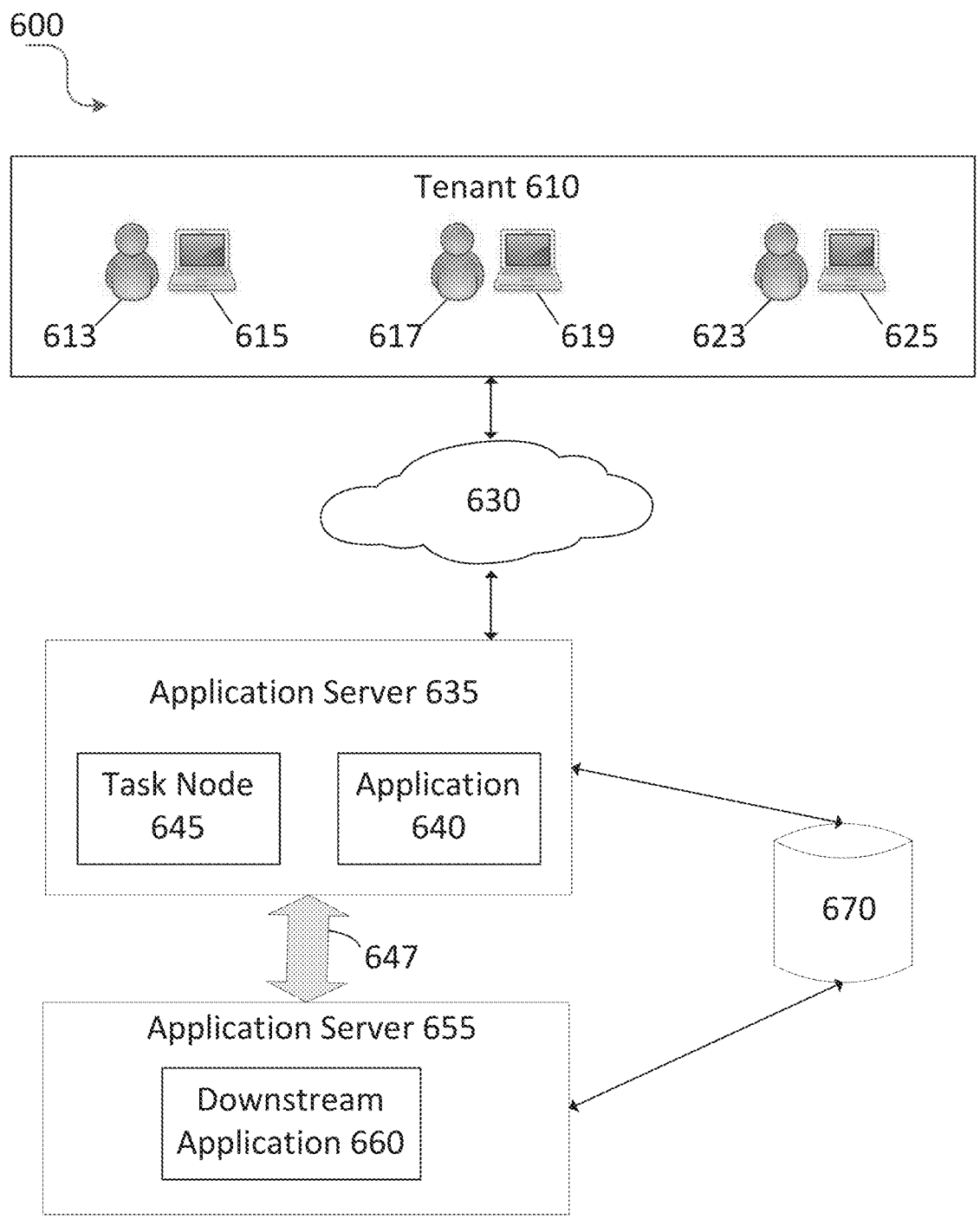
FIG. 6 depicts a system for notifying users and downstream applications of changes to a tenant's customized master data, in accordance with some example implementations.

FIG. 6 illustrates a system 600 for notifying users and downstream applications of changes to a tenant's customized master data. Tenant 610 can have three users 613, 617, and 623. Users 613 and 617 can use user interface nodes 615 and 619, respectively, to log into application 640 hosted on application server 635. User 623 can use user interface node 625 to log into downstream application 660 hosted on application server 655. Downstream applications, such as application 660, can use data values generated from upstream applications, such as application 640. User interface nodes 615, 619, and 625 can exchange messages with one or more of application servers 635 and 655 via one or more of network 630 and message broker 647. Application servers 635 and 655 can be connected to data repository 670. Data repository 670 can store a table of customized master data for tenant 610 at a data partition reserved for this particular tenant. This table of customized master data can be table 427, for example.

While user 613 is logged into application 640, the user may decide to create and/or modify the table of customized master data 427 stored at data repository 670. Any changes made to the table of customized master data 427 should be communicated to all other users associated with this tenant that are also logged into the same application 640. In the implementation of FIG. 6, user 617 should be notified of these changes in order to ensure that it is using the current version of customized master data.

Task node 645 within application server 635 can send a notification informing user interface node 619 of these changes. This notification can also instruct user interface node 619 to update its cache to properly reflect the new or updated table of customized master data 427. Upon receiving these instructions, user interface node 619 can request a copy of the table of customized master data 427 from application server 635. Application server 635 can fetch table 427 from data repository 670 and return the table to user interface node 619. User interface node 619 can save the table of customized master data 427 to its cache. In some implementations, task node 645 can include a copy of the table of customized master data 427 in its initial notification to user interface node 619. By doing so, user interface node 619 can immediately update its cache without waiting for application server 635 to subsequently fetch the table of customized master data 427. As user 617 executes transactions on application 640, user interface node 619 can use the updated table of customized master data 427 stored in its cache.

In addition to notifying users of changes to master data, downstream applications should also be notified of these changes. For example, as user 623 uses downstream application 660 to process transactions, application server 655 may need to access the table of customized master data 427 stored at data repository 670. If user 613 makes changes to this table as described above, then these changes should be propagated to downstream application 660 as well. In order to do so, application server 635 can publish a notification regarding this change to message broker 647. Downstream application 660 can listen to message broker 647 for this notification. Upon consuming the notification, downstream application 660 can update its table of customized master data by requesting a copy of the table from application server 655. Application server 655 can fetch the table of customized master data 427 from data repository 670 and send the table to downstream application 660. Downstream application 660 can use this table to update its master data.

In some implementations, an auditing framework can be provided that tracks changes to tenant maser data. This auditing framework can be implemented using, for example, a hash map that tracks tenant changes, a series of snapshots of the table of customized master data, and the like.

Figure 7:
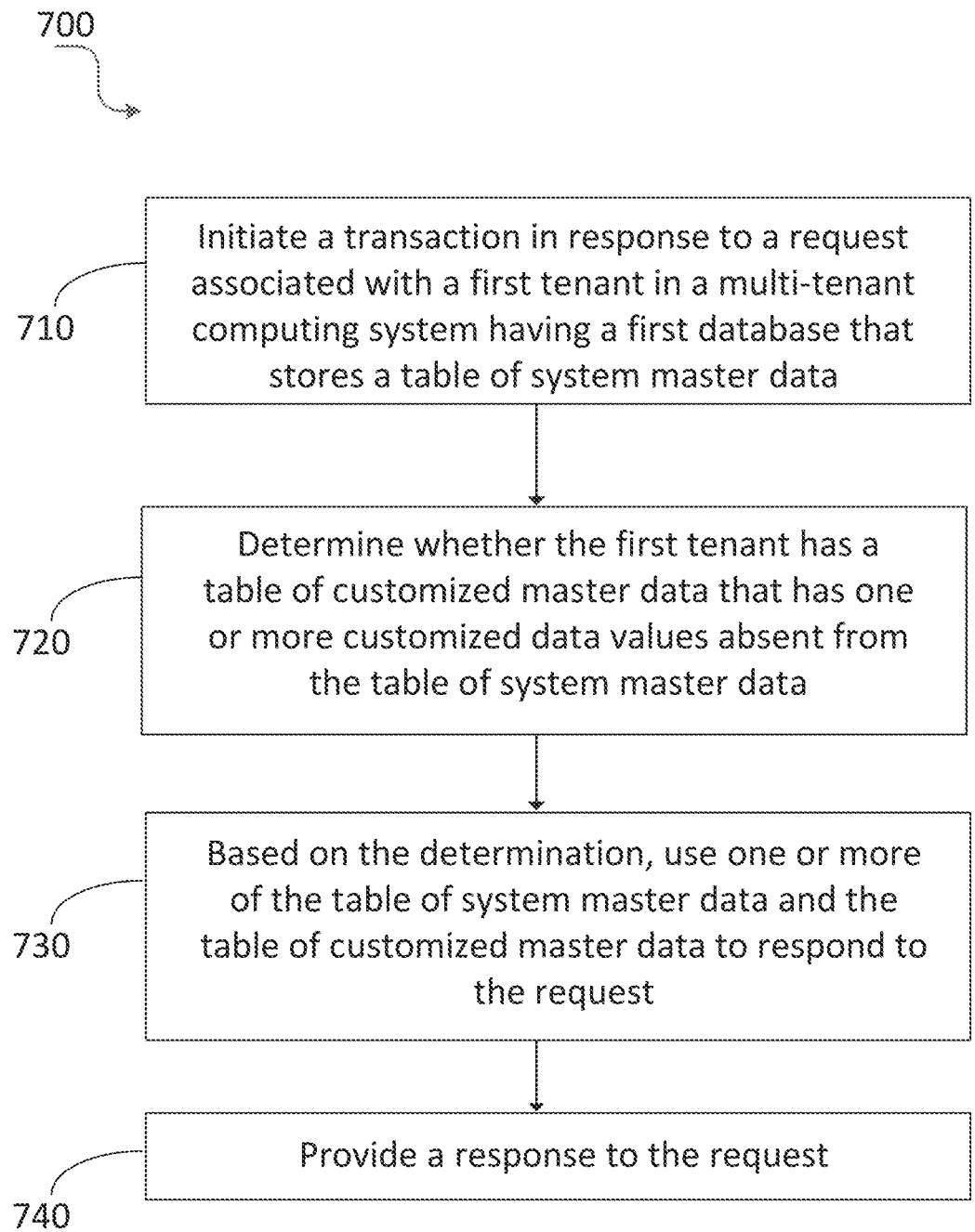
FIG. 7 depicts a flowchart for responding to a tenant's request using one or more of a table of system master data and a table of tenant customized master data, in accordance with some example implementations.

FIG. 7 illustrates a flowchart of a process 700 for responding to a tenant's request using one or more of a table of system master data and a table of tenant customized master data. Process 700 is described with reference to the preceding figures.

At 710, a transaction can be initiated in response to a request associated with a first tenant in a multi-tenant computing system. The multi-tenant computing system can include a first database, such as data repository 135. This database can include multiple partitions, one for each of a plurality of tenants in the multi-tenant computing system. One of these partitions can store a table of system master data, such as table 220, that can be shared by one or more tenants. This table of system master data can include one or more attributes and one or more corresponding values. In the implementation of FIG. 2B, for example, the attribute "Country" can have a data value equal to "Japan", "Canada", and "China", as indicated in master data records 230, 235, and 240, respectively.

At 720, a determination can be made as to whether the first tenant has a table of customized master data. This table of customized master data can be, for example, table 427 illustrated in FIG. 4B, and can only be accessible for transactions associated with the first tenant. This table of customized master data can have one or more customized data values absent from the table of system master data. In the implementation of FIG. 4B, for example, the attribute "Country" can have a data value equal to "Uganda", as indicated in master data record 443. This data value is absent from all of the master data records in the table of system master data 220.

Based on the above determination, one or more of the table of system master data and the table of customized master data can be used to respond to the request at 730. In the implementation of FIG. 5, for example, application server 503 can determine whether to use the table of system master data 220 stored at data repository 135 or the table of customized master data 427 stored at tenant controlled data repository 530. In doing so, application server 503 can check whether the table of system master data 220 is sufficient to process the transaction. If it is not, then application server 503 can use the table of customized master data 427. This can occur if, for example, the data values needed to process the transaction are absent from the table of system master data 220. In some implementations, application server 503 can query data repository 135 and tenant controlled data repository 530 at substantially the same time to make this determination.

At 740, a response to the request can be provided. In the implementation of FIG. 5, for example, application server 503 can send a response to UI display 505 which can, in turn, display the response to a user.

Some implementations can include the above-described methods being written as one or more software components. These components, and the functionality associated with each, can be used by client, server, distributed, or peer computer systems. These components can be written in a computer language corresponding to one or more programming languages such as, functional, declarative, procedural, object-oriented, lower level languages and the like. They can be linked to other components via various application programming interfaces and then compiled into one complete application for a server or a client. Alternatively, the components maybe implemented in server and client applications. Further, these components can be linked together via various distributed programming protocols. Some example implementations can include remote procedure calls being used to implement one or more of these components across a distributed programming environment. For example, a logic level can reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium can be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an implementation can be implemented using Java, C++, or other object-oriented programming language and development tools. Another implementation can be implemented in hard-wired circuitry in place of, or in combination with machine readable software instructions.

Figure 8:
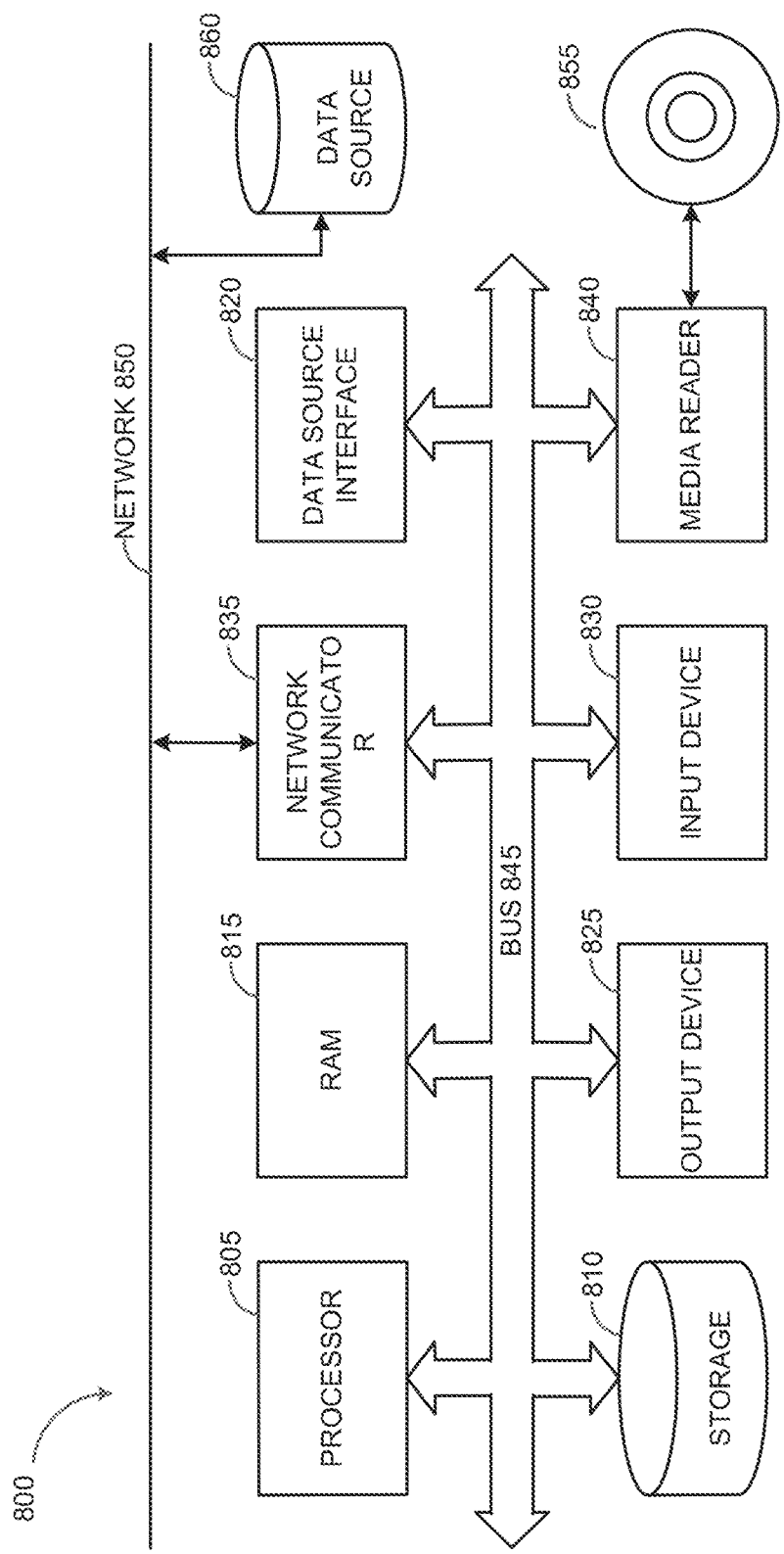
FIG. 8 depicts a block diagram illustrating a computing system, in accordance with some example implementations.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some implementations, such as some in-memory computing system implementations, the RAM 815 can have sufficient storage capacity to store much of the data required for processing in the RAM 815 instead of in the storage 810. In some implementations, all of the data required for processing can be stored in the RAM 815. The stored instructions can be further compiled to generate other representations of the instructions and dynamically stored in the RAM 815. The processor 805 reads instructions from the RAM 815 and performs actions as instructed. According to one implementation, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 can be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data repository interface 820 to access data repository 860. The data repository 860 can be accessed via one or more abstraction layers implemented in hardware or software. For example, the data repository 860 can be accessed by network 850. In some implementations the data repository 860 can be accessed via an abstraction layer, such as, a semantic layer.

A data repository is an information resource. Data repositories include sources of data that enable data storage and retrieval. Data repositories can include databases, such as, relational, transactional, hierarchical, multi-dimensional (e.g., OLAP), object oriented databases, and the like. Further data repositories include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data repository accessible through an established protocol, such as, Open Data Base Connectivity (ODBC), produced by an underlying software system (e.g., ERP system), and the like. Data repositories can also include a data repository where the data is not tangibly stored or otherwise ephemeral such as data streams, broadcast data, and the like. These data repositories can include associated data foundations, semantic layers, management systems, security systems and so on.

In the above description, numerous specific details are set forth to provide a thorough understanding of implementations. One skilled in the relevant art will recognize, however that the implementations can be practiced without one or more of the specific details or with other methods, components, techniques, etc. In other instances, well-known operations or structures are not shown or described in detail.

Although the processes illustrated and described herein include series of steps, it will be appreciated that the different implementations are not limited by the illustrated ordering of steps, as some steps can occur in different orders, some concurrently with other steps apart from that shown and described herein. In addition, not all illustrated steps can be required to implement a methodology in accordance with the one or more implementations. Moreover, it will be appreciated that the processes can be implemented in association with the apparatus and systems illustrated and described herein as well as in association with other systems not illustrated.

The above descriptions and illustrations of implementations, including what is described in the Abstract, is not intended to be exhaustive or to limit the one or more implementations to the precise forms disclosed. While specific implementations of, and examples for, the one or more implementations are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:
    exporting a table of system master data to a first tenant included in a plurality of tenants in a multi-tenant computing system causing the first tenant to generate a table of customized master data from the table of system master data, the multi-tenant computing system comprising a first database having one or more partitions, each partition corresponding to one or more of the plurality of tenants, one of the partitions storing the table of system master data available for use by each of the plurality of tenants, the table of system master data comprising one or more attributes, each attribute having a corresponding set of one or more values;
    initiating one or more transactions in response to a request associated with the first tenant;
    determining whether the first tenant has the table of customized master data, the table of customized master data including one or more customized data values absent from the set of one or more values in the table of system master data, the table of customized master data accessible only for transactions associated with the first tenant;

determining whether the table of system master data is sufficient to generate a response to the request;

in response to determining whether the table of system master data is sufficient to generate the response and whether the first tenant has a table of customized master data, using one or more of the table of system master data and the table of customized master data to respond to the request; and providing a response to the request.

2. The computer-implemented method of claim 1, wherein the table of customized master data is stored at a first partition in the first database, the first partition associated with the first tenant.

3. The computer-implemented method of claim 1, wherein the table of customized master data is stored at a second database maintained by the first tenant.

4. The computer-implemented method of claim 3, wherein the determining further comprises:

querying the first database to determine a location of the table of customized data values; and querying the second database to determine the location of the table of customized data values.

5. The computer-implemented method of claim 4, wherein the first database is queried before the second database.

6. The computer-implemented method of claim 4, wherein the first database is queried at approximately the same time as the second database.

7. The computer-implemented method of claim 3, further comprising:

fetching the one or more customized data values from the table of customized master data at the second database; and combining the one of more customized data values with the one or more values in the table of system master data to respond to the request.

8. The computer-implemented method of claim 1, wherein the multi-tenant computing system further comprises one or more applications, and wherein the first tenant is associated with one or more user nodes logged into the one or more applications.

9. The computer-implemented method of claim 8, further comprising:

sending a notification to each of the one or more user nodes regarding the table of customized master data, the notification causing the one or more user nodes to update one or more caches to reflect the table of customized master data.

10. The computer-implemented method of claim 8, wherein the one or more applications comprises an upstream application and a downstream application.

11. The computer-implemented method of claim 10, further comprising:

sending a notification to the downstream application regarding the table of customized master data.

12. The computer-implemented method of claim 1, further comprising:

maintaining a record of one or more changes to the table of customized master data.

13. A system, comprising:

at least one data processor; and at least one memory storing instructions which, when executed by the at least one data processor, result in operations comprising:

exporting a table of system master data to a first tenant included in a plurality of tenants in a multi-tenant computing system causing the first tenant to generate a table of customized master data from the table of system master data, the multi-tenant computing system comprising a first database having one or more partitions, each partition corresponding to one or more of the plurality of tenants, one of the partitions storing the table of system master data available for use by each of the plurality of tenants, the table of system master data comprising one or more attributes, each attribute having a corresponding set of one or more values;

initiating one or more transactions in response to a request associated with the first tenant;

determining whether the first tenant has the table of customized master data, the table of customized master data including one or more customized data values absent from the set of one or more values in the table of system master data, the table of customized master data accessible only for transactions associated with the first tenant;

determining whether the table of system master data is sufficient to generate a response to the request;

in response to determining whether the table of system master data is sufficient to generate the response and whether the first tenant has a table of customized master data, using one or more of the table of system master data and the table of customized master data to respond to the request; and providing a response to the request.

14. The system of claim 13, wherein the table of customized master data is stored at a first partition in the first database, the first partition associated with the first tenant.

15. The system of claim 13, wherein the table of customized master data is stored at a second database maintained by the first tenant.

16. The system of claim 13, wherein the multi-tenant computing system further comprises one or more applications, wherein the first tenant is associated with one or more user nodes logged into the one or more applications, and wherein the operations further comprise:

sending a notification to each of the one or more user nodes regarding the table of customized master data, the notification causing the one or more user nodes to update one or more caches to reflect the table of customized master data.

17. The system of claim 16, wherein the one or more applications comprises an upstream application and a downstream application, and wherein the operations further comprise:

sending a notification to the downstream application regarding the table of customized master data.

18. A non-transitory computer readable medium storing instructions, which when executed by at least one data processor, result in operations comprising:

exporting a table of system master data to a first tenant included in a plurality of tenants in a multi-tenant computing system causing the first tenant to generate a table of customized master data from the table of system master data, the multi-tenant computing system comprising a first database having one or more partitions, each partition corresponding to one or more of the plurality of tenants, one of the partitions storing the table of system master data available for use by each of the plurality of tenants, the table of system master data comprising one or more attributes, each attribute having a corresponding set of one or more values;

initiating one or more transactions in response to a request associated with the first tenant;

determining whether the first tenant has the table of customized master data, the table of customized master data including one or more customized data values absent from the set of one or more values in the table of system master data, the table of customized master data accessible only for transactions associated with the first tenant;

determining whether the table of system master data is sufficient to generate a response to the request;

in response to determining whether the table of system master data is sufficient to generate the response and whether the first tenant has a table of customized master data, using one or more of the table of system master data and the table of customized master data to respond to the request; and providing a response to the request.

19. The non-transitory computer readable medium of 18, wherein the table of customized master data is stored at a first partition in the first database, the first partition associated with the first tenant, or stored at a second database maintained by the first tenant.

20. The non-transitory computer readable medium of 18, wherein the multi-tenant computing system further comprises one or more applications, wherein the first tenant is associated with one or more user nodes logged into the one or more applications, and wherein the operations further comprise:

sending a notification to each of the one or more user nodes regarding the table of customized master data, the notification causing the one or more user nodes to update one or more caches to reflect the table of customized master data.

* * * * *